US011151211B2

(12) United States Patent
Jabara

(10) Patent No.: US 11,151,211 B2
(45) Date of Patent: Oct. 19, 2021

(54) SYSTEM AND METHOD FOR REAL ESTATE INFORMATION PROCESSING ON A MOBILE COMMUNICATION DEVICE

(71) Applicant: Mobilitie, LLC, Newport Beach, CA (US)

(72) Inventor: Gary Bernard Jabara, Newport Beach, CA (US)

(73) Assignee: Mobilitie, LLC, Newport Beach, CA (US)

( * ) Notice: Subject to any disclaimer, the term of this patent is extended or adjusted under 35 U.S.C. 154(b) by 234 days.

(21) Appl. No.: 16/256,959

(22) Filed: Jan. 24, 2019

(65) Prior Publication Data

US 2019/0228042 A1    Jul. 25, 2019

Related U.S. Application Data

(60) Provisional application No. 62/622,040, filed on Jan. 25, 2018.

(51) Int. Cl.
*G06F 16/9537* (2019.01)
*G06Q 50/16* (2012.01)
*G06F 16/903* (2019.01)
*G06F 3/0488* (2013.01)
*H04M 1/72445* (2021.01)

(52) U.S. Cl.
CPC ........ *G06F 16/9537* (2019.01); *G06F 3/0488* (2013.01); *G06F 3/04883* (2013.01); *G06F 16/903* (2019.01); *G06Q 50/16* (2013.01); *H04M 1/72445* (2021.01)

(58) Field of Classification Search
None
See application file for complete search history.

(56) References Cited

U.S. PATENT DOCUMENTS

| 7,479,949 | B2 * | 1/2009 | Jobs | H04M 1/72552 345/173 |
| 8,713,476 | B2 * | 4/2014 | Martyn | H04M 1/72469 715/808 |
| 2010/0145800 | A1 * | 6/2010 | Eraker | G06F 16/9537 705/14.49 |

(Continued)

OTHER PUBLICATIONS

Poineni, Data Warehousing Guide Jun. 2017, Oracle, TOC, Chapter 1.*

(Continued)

*Primary Examiner* — Jason G Liao
(74) *Attorney, Agent, or Firm* — Davis Wright Tremaine LLP; Michael J. Donohue

(57) ABSTRACT

A real estate information processing system and method for a mobile communication device optimizes operational features for use with a mobile device. The user can easily specify search parameters for searching real estate listings or for searching for a real estate agent. The search results are displayed on a series of results pages. The user can quickly save or delete each page of search results by swiping a finger across the touch-sensitive display of the mobile communication device. In a similar fashion, the user can specify search parameters, such as price range, by simply sliding a finger across the display. The navigation techniques permit the user to view large amounts of data and quickly make selections.

16 Claims, 3 Drawing Sheets

(56) References Cited

U.S. PATENT DOCUMENTS

2015/0269264 A1* 9/2015 Bolen ................ G06Q 30/0627
705/26.63

OTHER PUBLICATIONS

London, The woman proving her male doubters wrong: Tinder co-founder, 27, who left over sexual harassment launches 'feminist LinkedIn' (and Karlie Kloss is on board) Nov. 28, 2017, Daily Mail, https://www.dailymail.co.uk/femail/article-5124743/The-woman-proving-men-sexually-harassed-wrong.html?ITO=1490&ns_mchannel=rss.*

Tepper, Bumble's business networking feature launches today Oct. 2, 2017, TechCrunch, https://techcrunch.com/2017/10/02/bumbles-business-networking-feature-launches-today/.*

Streamline data fields Mar. 19, 2021, Google, https://www.google.com/search?q=streamline+data+fields&source=hp&ei=Ws1UYPG7H--w5NoPkZKfoAI&iflsig=AINFCbYAAAAAYFTbajy3WbV0WTggA_VE68yZovL11Ghr&oq=streamline+data+fields&gs_lcp=Cgdnd3Mtd2l6EAMyBQgAEM0COgUIABCxAzoICAAQsQMQgwE6CAguELEDEIMBOgslLhCxAxDHARCjAjolCC4QxwEQowl6AgguOgllADoFCC4QsQM6CAguELEDEJMCOgglLhDHARCvAToKCAAQsQMQRhD5AToFCAAQyQM6CwguEMcBEK8BEJMCOgQIABAKOgYIABAWEB46BQghEKABOgUIIRCrAjoHCCEQChCgAVCsAljnHGCIHmgAcAB4AIABalgBywqSAQQyMC4ymAEAoAEBqgEHZ3dzLXdpepeg&sclient=gws-wiz&ved=0ahUKEwjx0MnT37zvAhVvGFkFHRHJByQQ4dUDCAw&uact=5#spf=1616170334759.*

Pathak, ETL—Understanding It and Effectively Using It Jan. 7, 2019, medium.com, https://medium.com/hashmapinc/etl-understanding-it-and-effectively-using-it-f827a5b3e54d.*

Colleen, How to Use Google Maps Without WIFI or Roaming Nov. 1, 2017 [per HTML Code, line 36], How Beautiful Life Is, https://howbeautifullifeis.com/how-to-use-google-maps-without-wifi-or-roaming/.*

* cited by examiner

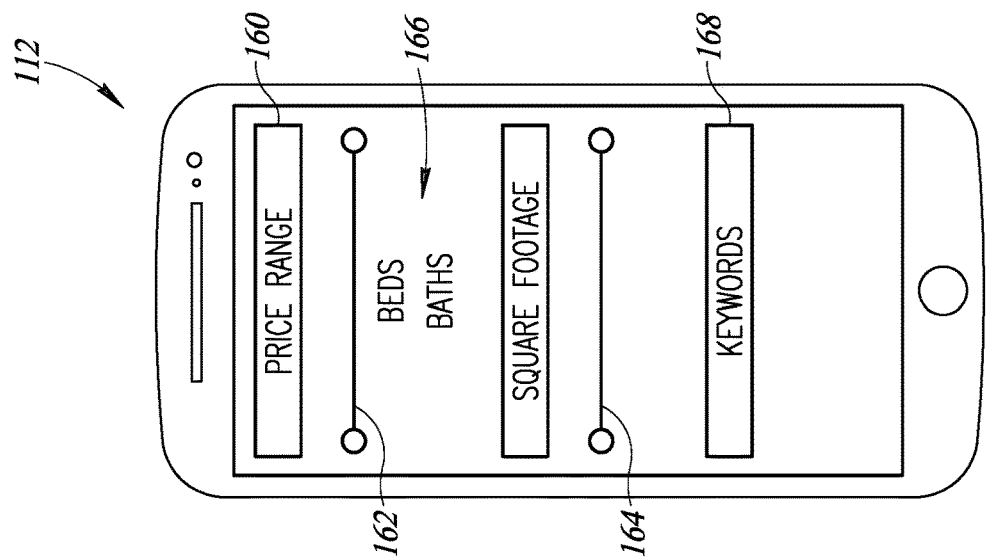
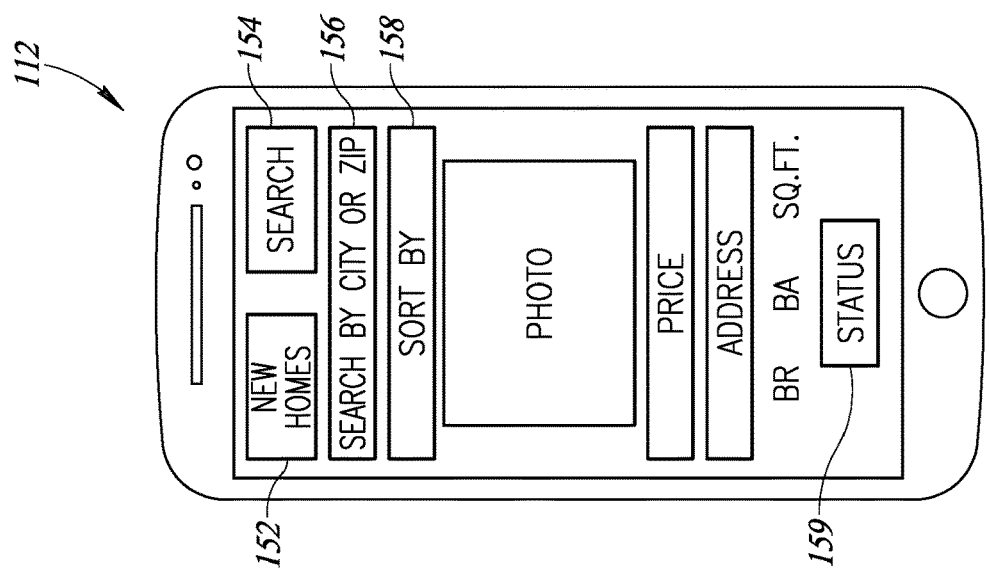
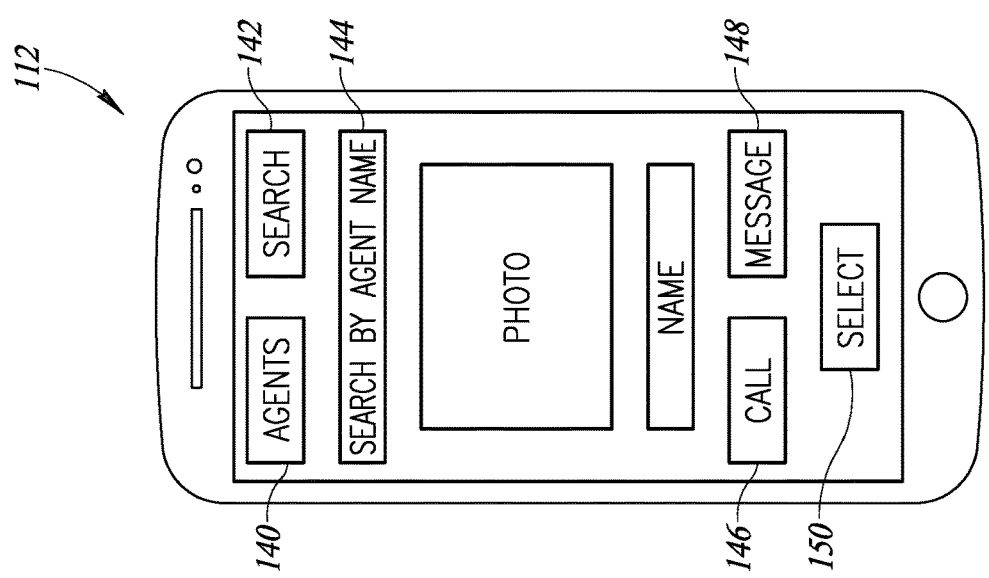

SYSTEM AND METHOD FOR REAL ESTATE INFORMATION PROCESSING ON A MOBILE COMMUNICATION DEVICE

CROSS REFERENCE TO RELATED APPLICATIONS

This application is a non-provisional application of U.S. Provisional Patent Application No. 62/622,040, filed Jan. 25, 2018, the entire disclosure and content of which are hereby incorporated by reference in its entirety.

BACKGROUND OF THE INVENTION

Field of the Invention

The present disclosure relates to processing of real estate information and, more particularly, to a system and method for real estate information processing on a mobile communication device.

Description of the Related Art

The Internet is a valuable source of vast amounts of data related to real estate. Many websites provide information about specific homes, neighborhoods, towns, and cities. Websites can provide home pricing and valuation information. Some applications, such as Google Street View, allow the user to virtually navigate down a street in the desired neighborhood.

Many real estate companies have their own websites with access to exclusive listings as well as listings on multiple listing services (e.g. MLS). The websites permit a user to apply filter functions, such as desired price ranges, number of bedrooms, and the like to filter through the massive amounts of data.

Navigating through a real estate company website can be an imposing challenge for a typical user under normal circumstances. If the user is gaining access to a real estate company website via a mobile communication device (e.g., a cellphone), navigation throughout the website can be challenging at best and, at worst, nearly impossible to use. Therefore, it can be appreciated that there is a significant need for a product to provide operable on a mobile platform that simplifies the search and display of real estate information. The present invention provides this, and other advantages, as will be apparent from the following detailed description and accompanying figures.

BRIEF DESCRIPTION OF THE SEVERAL VIEWS OF THE DRAWING(S)

FIG. 3 illustrates the operation of the system to select a real estate agent.

FIG. 4 is a display of real estate properties resulting from the application of the user selection criteria to a database of available properties.

FIG. 5 is a screenshot illustrating the display of filter selection criteria selectable by a user.

DETAILED DESCRIPTION OF THE INVENTION

The present disclosure is related to a real estate software application configured for operation on a mobile device. The tools provided herein simplify the navigation process for the user in the selection of agents, the selection of search criteria for real estate, the evaluation of agents, real estate listings, and simplified communication and collaboration techniques.

Figure 1:
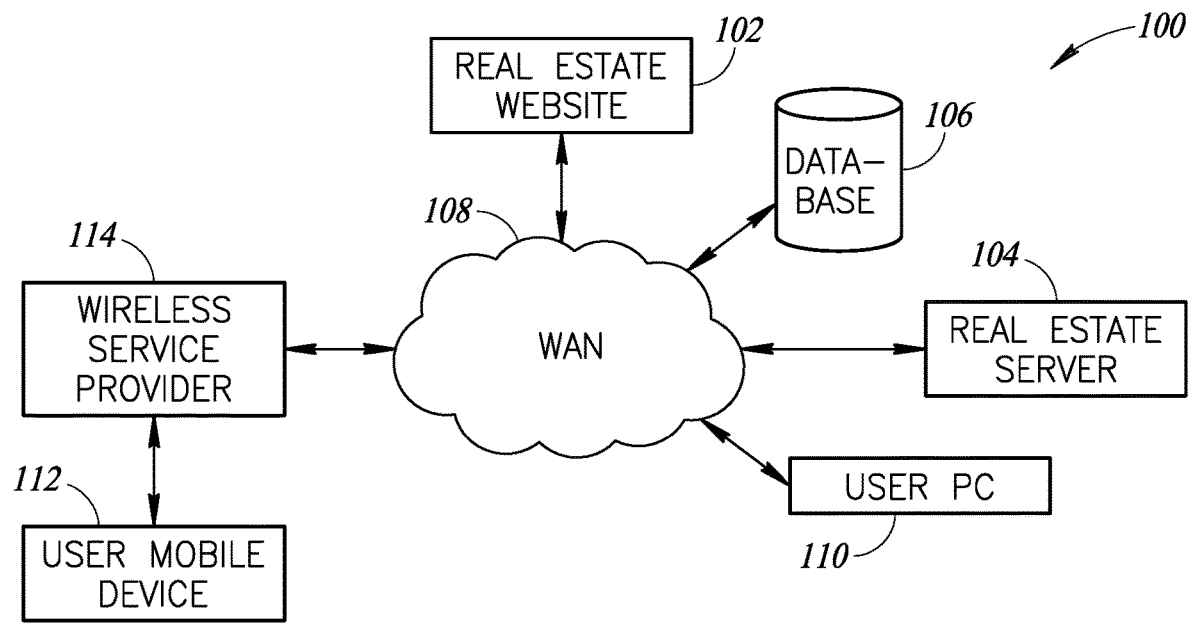
FIG. 1 is a system diagram illustrating the environment in which the mobile device operates in accordance with the present disclosure.

FIG. 1 illustrates a typical wide-area network in which the present system operates. In FIG. 1, a system 100 comprises a real estate website 102 and a real estate server 104. In an exemplary embodiment, the reals estate server 104 may be implemented in combination with the real estate website 102 and operated by the real estate company associated with the real estate website.

In FIG. 1, a multiple listing real estate database 106 provides multiple listings for many real estate companies. Those skilled in the art will appreciate that the individual real estate websites (e.g., the real estate website 102) may have their own database with exclusive real estate listings that are not part of the database 106. The various components are coupled to a wide-area network (WAN) 108, such as the Internet. In one embodiment the real estate server 104 downloads a copy of the database 106 and modifies it for operation with a mobile platform. This modification may include the elimination of unnecessary data fields, streamlining of other data fields and an overall reformatting to accommodate display on a mobile platform.

In FIG. 1, a user personal computer 110 (e.g., a desktop, laptop, computing tablet, or the like) is coupled to the WAN 108 and communicates with the real estate website 102 via the WAN. In an alternative embodiment, the user has a mobile device 112, such as a cellphone, laptop, tablet, or the like. The mobile device 112 may access the WAN 108 via a wireless service provider 114. In one embodiment, the wireless service provider 114 may be a cellular company. Alternatively, the wireless service provider 114 may represent an access point in which the mobile device 112 connects to the WAN 108 via an access point.

In operation, the user specifies search criteria, as will be described below, and submits the search query to the real estate server 104. The search itself is executed by the real estate server 104 and the results returned to the mobile device 112.

Among the features provided by the application disclosed herein, is the ability to search for real estate listings by the current location of the mobile device 112. In this embodiment, the system 100 will apply the user selection criteria to identify real estate listings in an area proximate the current location of the mobile device 112.

In an alternative embodiment, the system 100 includes a map drawing tool in which a map is displayed on the display of the mobile device 112. The user may select a desired search area by drawing directly on the touch-sensitive display of the mobile device 112 to demarcate a search area. The system 100 searches the database 106 for appropriate real estate listings within the user-selected mapped area.

In another embodiment, the system 100 allows the user to search by address. The user enters the address on the mobile device 112 and the related real estate listing is extracted from the database 106 for display. In yet another aspect, the search results include a full address of the property listing.

In another option, the system 100 allows search and display of the posting date for a real estate property. A user can search for recent listings, or listings that, by way of example, are older (e.g., at least 90 days).

The system 100 also allows a property status to be listed for the real estate listings provided to the mobile device 112. For example, the listing of status, such as active, sale pending, sold, and the like can be useful when searching for real estate listings. In addition, the user may apply such status as a search criteria such that listings from the database 106 are filtered on the basis of, among other things, the selected property status.

In yet another aspect, the system 100 allows a user to filter data results by an open house. This feature allows the user to display search results from the database 106 on the mobile device 112 based on the availability of an open house for the property listings.

Other features of the system 100 include expanded agent biography, description, and area(s) of specialty. Agent's identification associated with particular real estate listings are also prominently featured to provide more readily discoverable agent profiles. Furthermore, a new email feature simplifies client to agent email, text, or in-app messaging integration.

Another feature of the system 100 is the ability to invite another individual to collaborate or link accounts. For example, a group of people, each with a separate mobile device 112, can share search information and search results through the collaboration feature. In addition, multiple individuals may share a linked account, which would permit a user to access the linked account and view search results generated by others. Finally, the system 100 also provides market insights for the user. This may include, by way of example, real estate price trends, average length of time on the market for a particular geographic area, and the like. These insights may guide a user in selecting a particular neighborhood or region within a particular real estate market.

Those skilled in the art will appreciate that the system 100 may be used by both home buyers and real estate agents. In some cases, a potential buyer may already own a home and is seeking a new home for purchase in combination with listing their current home for sale. In yet another embodiment, the system 100 permits a user to place their current residence on the market.

Figure 2:
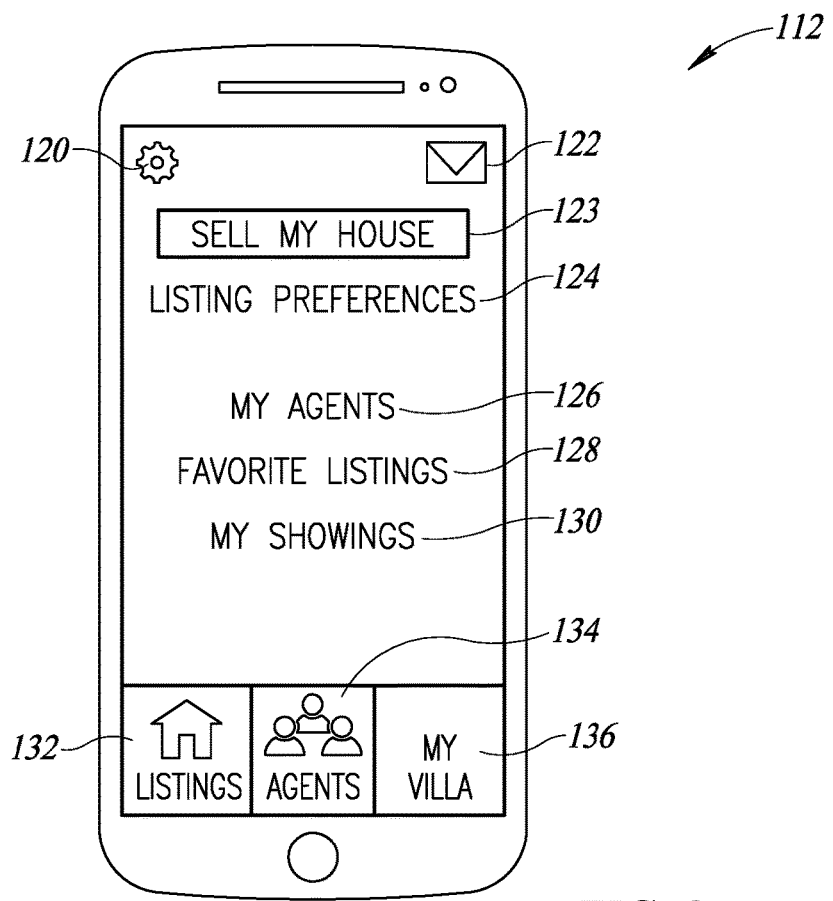
FIG. 2 is a screenshot illustrating an opening screen display for the mobile communication device of FIG. 1.

FIG. 2 illustrates a sample screenshot of the display of the mobile device 112. A Settings icon 120 allows the user to view/edit their personal settings for an account associated with the system 100. A Mail icon 122 allows the user of the mobile device 112 to access email associated with the system 100.

In FIG. 2, the screen display of the mobile device 112 also includes a Sell My Home command button 123. As noted above, the system 100 permits the user to list their current residence for sale. Activation of the Sell My Home command button 123 will cause the mobile device 112 to display a screen where the user can enter information about their current residence. The system 100 can also navigate to a display of contractual information regarding the listing of real estate. The user-entered information will be routed to an agent (typically via text message, email or in-app message) if one has already been selected by the user. If the user has not yet selected a real estate agent, the information can be routed to the associated real estate company and assigned to an agent by the company.

In FIG. 2, the screen display of the mobile device 112 also includes a Listing Preferences command 124, which allows a user to view/edit user selection criteria used to filter data in the database 106. A My Agents command 126 allows a user to view/edit real estate agent listings. The selection of real estate agents will be described in greater detail below.

A Favorite Listings command 128 allows the user to view/edit listings from previous searches of the database 106. A My Showings command 130 allows a user to view/edit showings of real estate listings. At the bottom of the display on the mobile device 112 are selection buttons for Listings 132, Agents 134, and My Account 136. By simply tapping on the appropriate command on the touch-sensitive display of the mobile device 112, a user can select any of these features. The Listing button 132 shows the results of any previous searches conducted by the user. The Agents button 134 allows the user to display/edit agent selections. The My Account button 136 allows the user to view all information associated with their account.

FIG. 3 illustrates a screenshot of a mobile device 112 in response to selection of the Agents command 134 on the screen display of FIG. 2. As a result of this selection, the mobile device 112 will show one or more real estate agents. If the user has previously selected and saved bios of certain real estate agents, those agents will be displayed on individual results pages on the mobile device 112.

As illustrated in FIG. 3, the display includes two command options at the top of the display on the mobile device 112. An Agent command button 140 will display the individual pages of real estate agents previously saved by a user as well as individual pages of real estate agents that have not yet been reviewed by the user. If this is the first time a user has begun a search for agents, all agents for a particular company may be listed and available for review.

A Search command button 142 allows the user to select search criteria to identify real estate agents. For example, the user can select various ranges of real estate experience, whether the real estate agents work alone or on a team, the geographic location of the real estate agent(s), and the like.

The user may also search by agent name if desired. If the user selects the search by agent name command button 144, the mobile device 112 can display a keyboard (not shown) to permit the manual entry of an agent name.

The screen display illustrated in the example of FIG. 3 also shows a photograph and name of the agent on the particular result page. The user may elect to save the result of a particular agent by swiping left on the touch-sensitive display of the mobile device 112 or may delete a particular agent from consideration by swiping right on the touch-sensitive display of the mobile device.

The display of FIG. 3 also includes a Call button 146 and a Message button 148 for contacting the agent shown on the particular results page. Activation of the Call button 146 will initiate a phone call from the mobile device 112 to the agent. Selection of the Message button 148 will permit the user of the mobile device 112 to send a text message, email or in-app message to the communication device of the agent on the currently displayed results page.

Finally, if the user of the mobile device 112 has made a final selection as to agent, they can activate a Select This Agent command button 150. Selection of a particular agent will cause a message (text, email, or in-app message) to be automatically sent to the agent to initiate further contacts between the user and the selected agent.

If the user of the mobile device 112 has selected the Listings command 132 on the screen display illustrated in FIG. 2, the display of the mobile device 112 will display previously saved search results. Alternatively, if the user has no previously saved data, the system 100 may perform a search of real estate listings to display sequentially as a series of results pages. FIG. 4 illustrates a screen display of the mobile device 112 upon activation of the Listing command 132 on the screen display of FIG. 2. As illustrated in FIG. 4, the user of the mobile device 112 can initiate a new search by selecting a New Homes command button 152 or specify user-selected criteria for the search by activating a Search command button 154. Selection of the New Homes command button 152 will display a sequence of results pages previously saved by the user or the result of a current search. The selection of the Search command button 154 allows the user to select search criteria, as will be described in greater detail below.

Returning to FIG. 4, the user may enter the name of a city or zip code in text box 156, which limits the search and can also select a sorting criteria, such as sorting by most recent, price (high to low or low to high), number of bedrooms, number of baths, square footage, and the like in a sorting field 158. The screen display of FIG. 4 also includes a photograph of the listed property as well as the price and address of the listed property. The screen display of the mobile device may also include number of bedrooms, baths, square footage, and the like. In addition, the current listing status of the individual property may be included in a status text box 159 on the display of the mobile device 112.

FIG. 5 illustrates the display of the mobile device 112 in response to the selection of the Search command button 154 in FIG. 4. The search feature permits the user to easily select search parameters. A Price Range 160 display user-selected price ranges (if any). A price slide bar 162 allows the user to define a price range. The user can define a low end of a desired price range by touching the low (i.e., left) end of the price slide bar 162 and slide it to the right. As the user finger slides to the right, the minimum price is shown on the display of the mobile device 112. Similarly, the user can define an upper price by touching the upper (i.e., right) end of the price slide bar 162 and slide it to the left. As the user finger slides to the left, the maximum price is shown on the display of the mobile device 112.

A size slide bar 164 operates in a similar manner to permit the user to define a square footage range. The user can define a lower end of the square footage range by touching the low (i.e., left) end of the size slide bar 164 and slide it to the right. As the user finger slides to the right, the minimum square footage is shown on the display of the mobile device 112. Similarly, the user can define an upper end of the square footage range by touching the upper (i.e., right) end of the size slide bar 164 and slide it to the left. As the user finger slides to the left, the maximum square footage is shown on the display of the mobile device 112.

FIG. 5 also illustrates additional search parameters 166, such as number of bedrooms, number of baths, and the like. A keyword text box 168 permits the user to include keywords in the search parameters. For example, the user can add "swimming pool" in the keyword text box 168.

Figure 6:
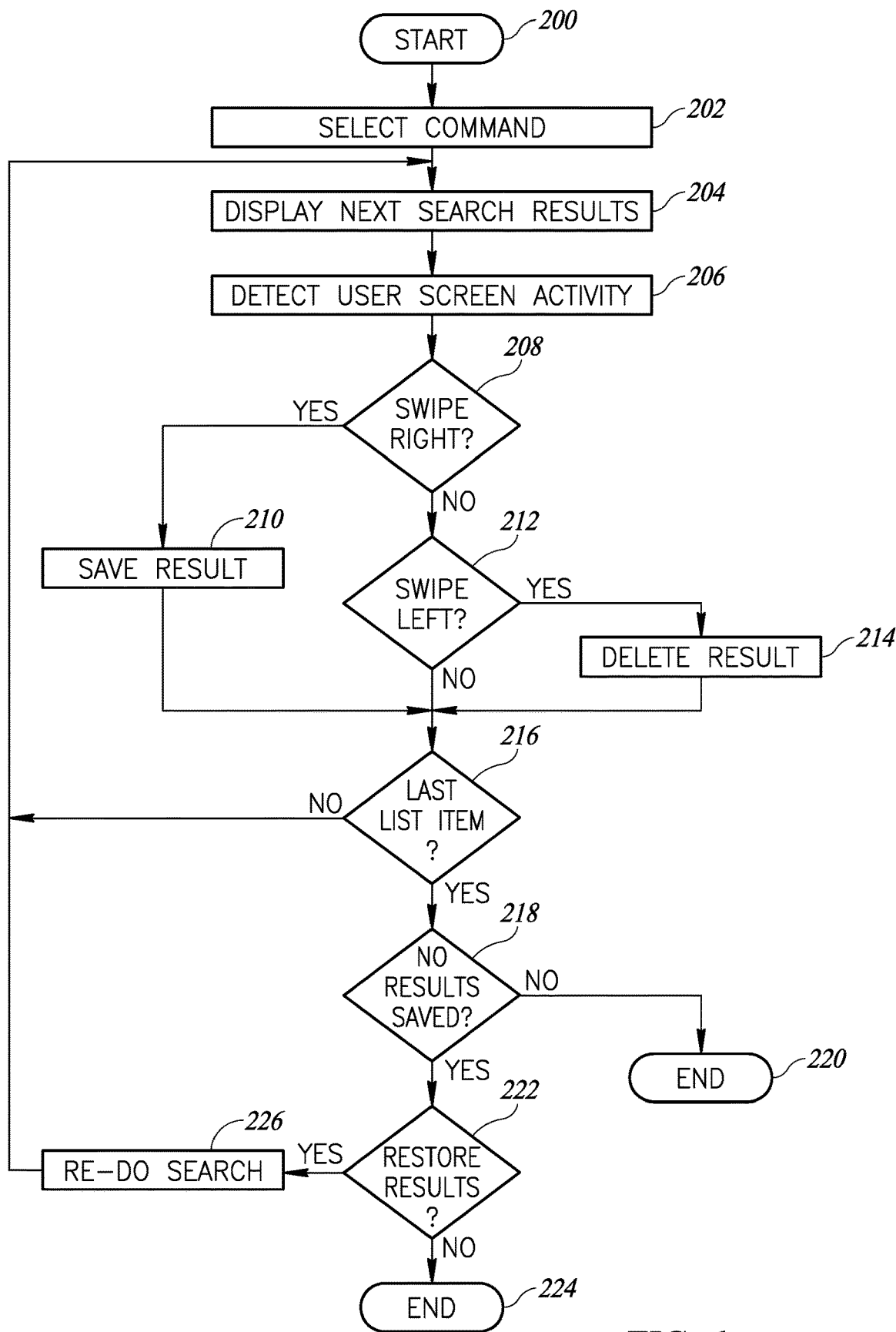
FIG. 6 is flowchart illustrating the operation of the system of FIG. 1.

FIG. 6 is a flowchart illustrating an exemplary embodiment used to implement the system 100. The flowchart of FIG. 6 illustrates the display of data elements for review by the user and for the simplified process for the user to either save a particular result item or to delete the particular result. The display items can be, for example, real estate listings that are the result of a search based on user-selected search criteria. As noted above, such search criteria can include geographic area, age of the house (i.e., year of construction), house style, number of bedrooms/bathrooms, minimum/maximum price ranges, minimum/maximum square footages, and the like. Those skilled in the art will appreciate that the user can select any of these search criteria as a basis for filtering results from the database 106. In this example, the results of a search may typically include a number of real estate listings. The user can sequentially view each of the listings and, with a simple swipe of the finger on the display of the mobile device 112, either save a particular search result or delete it. As the user swipes their finger across the current page of results, the next page of results is automatically display for user evaluation.

In the embodiment described herein, the user can save a results page by swiping right along the touch-sensitive display of the mobile device 112. Conversely, the user can delete a results page by swiping left along the touch-sensitive display of the mobile device 112. However, those skilled in the art will appreciate that the system could easily be implemented with the opposite movements (i.e., swipe left to save and swipe right to delete). For that matter other "swipe" movements along the display of the mobile device 112 are also within the scope of the present disclosure. For example, swipe up to save and swipe down to delete. The system 100 is not limited by the particular implementation of swipe movements.

Similarly, the flowchart of FIG. 6 may be used for the display and selection of real estate agents. As with the real estate listings described above, the system will sequentially display real estate agent information on the mobile device 112. The user may save a particular real estate agent file or delete a real estate agent file by simply swiping the finger in the appropriate direction on the touch-sensitive display of the mobile device.

At a start 200, the user has downloaded the software application to the mobile device 112. In step 202, the user selects a command, such as the Listing command button 132 or the Agent command button 134 illustrated in the screenshot of FIG. 2. In step 204, the mobile device 112 displays a next page of results. As noted above, this may be a series of real estate listings or a list of available real estate agents, depending on the command selected by the user in step 202. In step 206, the mobile device 112 detects user screen activity. In an exemplary embodiment, the user simply swipes their finger on the display screen to the right in order to save a result. If the user wishes to delete a particular result page, the user can simply swipe their finger to the left across the touch-sensitive display of the mobile device 112.

Returning to the flowchart of FIG. 6, at decision 208, the mobile device 112 determines whether the user swiped right. If the result of decision 208 is YES, the system 100 saves the particular page of results in step 210. If the user did not swipe to the right, the result of decision 208 is NO and, in decision 212, the system 100 determines whether the user swiped to the left. If the user swiped to the left, the result of decision 212 is YES and, step 214, the system 100 deletes the current page of results. If the user did not swipe to the left, the result of decision 212 is NO.

In decision 216, the system 100 determines whether the current page of results is the last page of results on the list. If the current page is not the last page of results on the list, the result of decision 216 is NO and the flow returns to step 204 to display the next page of results. This process if repeated, with the user swiping left to save a result or swiping right to delete a result until the last item on the list is displayed. If the currently-listed result is the last item on the list, the result of decision 216 is YES.

In that event, the system 100 determines whether there is a condition under which no results were saved (i.e., the user swiped right for every page of results). If at least some results were saved, the result of decision 218 is NO and the process ends at 220.

If no results were saved, the result of decision 218 is YES and, in decision 222, the user has the option to restore the original results. If the user elects not to restore the original pages of results, the result of decision 222 is NO and, the process ends at 224 without any saved results.

If the user elects to restore the original results, the result of decision 222 is YES. In that event, the system 100 may re-execute the search in step 226 and return to step 204 to display the results pages in the manner described above.

This simplified swipe left/swipe right selection mechanism allows the user to quickly go through as list of results without the typical cursor manipulation and clicking on command buttons to save or delete results. This convenience is especially useful in a mobile communication device, which typically has limited display surface area and little available room for conventional buttons, such as SAVE, DELETE, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A system for real estate data retrieval, editing, and displaying on a mobile communication device, the system comprising:
   a multi-agency real estate listing database configured to store real estate listings associated with a plurality of different real estate companies;
   a real estate server communicatively coupled to the multi-listing database and configured to download a copy of the multi-agency real estate listing database;
   the real estate server being configured to modify the copy of the real estate listing database for operation with a mobile platform by reformatting the copy of the real estate listing database to accommodate display on the mobile platform;
   a consumer wireless communication device operable by a user and containing a software application program that permits the wireless communication device to communicate with the real estate server and to search real estate listings in the modified real estate listing database in accordance with user-selected search parameters;
   the software application program being configured to display a map on a touch-sensitive display of the wireless communication device, the display of the map being alterable by the user by drawing directly on the touch-sensitive display of the wireless communication device to demarcate a search area on the displayed map as a user-selected search parameter; and
   the real estate server being further configured to apply the user-selected search parameters, including the demarcated search area on the displayed map, to search the modified real estate listing database to thereby generate search results, the real estate server being further configured to transmit the search results for display on the wireless communication device.

2. The system of claim 1 wherein the software application program provides a list of available real estate agents for display on the display of the wireless communication device, the software application program being operable to detect a first single user motion on the touch sensitive display to save information related to an agent listed on the display and a second single user motion on the touch sensitive display to delete information related to an agent listed on the display.

3. The system of claim 2 wherein the first single user motion on the touch sensitive display is a finger swipe motion across the touch sensitive display in a first predetermined direction and the second single user motion on the touch sensitive display is a finger swipe motion across the touch sensitive display in a second predetermined direction different from the first predetermined direction.

4. The system of claim 1 wherein the user-selected search parameters include at least one of a group of parameters consisting of: a number of bedrooms, a number of bathrooms, a square footage, a date of construction, a price, a zip code, and a city.

5. The system of claim 1 wherein the user-selected search parameters include at least one of a group of parameters consisting of: a minimum acceptable number of bedrooms, a minimum acceptable number of bathrooms, a range of square footages, a range of dates of construction, and a range of prices.

6. The system of claim 5 wherein the display of the wireless communication device is a touch sensitive display and the software application program detects user activation on predetermined portions of the display to adjust the user-selected search parameters by selecting a minimum acceptable number of bedrooms, selecting a minimum acceptable number of bathrooms, selecting a range of square footages, selecting a range of dates of construction, and selecting a range of prices.

7. A method for real estate data retrieval, editing, and displaying on a mobile communication device using a multi-agency real estate listing database that contains stored real estate listings associated with a plurality of different real estate companies, the method comprising:
   downloading a copy of the multi-agency real estate listing database to a real estate server associated with a first real estate company, the real estate server being communicatively coupled to the multi-listing database, the real estate server downloading a copy of the multi-agency real estate listing database;
   the real estate server modifying the copy of the real estate listing database for operation with a mobile platform by reformatting the copy of the real estate listing database to accommodate display on the mobile platform;
   communicating with a consumer wireless communication device operable by a user and containing a software application program that permits the wireless communication device to communicate with the real estate server, the software application program being configured to display a map on a touch-sensitive display of the wireless communication device, the display of the map being alterable by the user by drawing directly on the touch-sensitive display of the wireless communication device to demarcate a search area on the displayed map as a user-selected search parameter;
   the real estate server receiving a real estate search request from the wireless communication device, the real estate search request including user-selected search parameters, including the demarcated search area on the displayed map;
   the real estate server applying the user-selected search parameters, including the demarcated search area on the displayed map, to search the modified copy of the database to thereby generate search results; and
   the real estate server communicating with the wireless communication device to transmit the search results to the wireless communication device for display on the wireless communication device.

8. The method of claim 7 wherein the software application program provides a list of available real estate agents for display on the display of the wireless communication device, the software application program detecting a first single user motion on the touch sensitive display to save information related to an agent listed on the display and a second single user motion on the touch sensitive display to delete information related to an agent listed on the display.

9. The method of claim 8 wherein detecting the first single user motion on the touch sensitive display comprises detecting a finger swipe motion across the touch sensitive display in a first predetermined direction and detecting the second single user motion on the touch sensitive display comprises detecting a finger swipe motion across the touch sensitive display in a second predetermined direction different from the first predetermined direction.

10. The method of claim 7 wherein the user-selected search parameters include at least one of a group of parameters consisting of: a number of bedrooms, a number of bathrooms, a square footage, a date of construction, a price, a zip code, and a city.

11. The method of claim 7 wherein the user-selected search parameters include at least one of a group of parameters consisting of: a minimum acceptable number of bedrooms, a minimum acceptable number of bathrooms, a range of square footages, a range of dates of construction, and a range of prices.

12. The method of claim 11 further comprising the software application program detecting user activation on predetermined portions of the touch sensitive display to adjust the user-selected search parameters by selecting a minimum acceptable number of bedrooms, selecting a minimum acceptable number of bathrooms, selecting a range of square footages, selecting a range of dates of construction, and selecting a range of prices.

13. A non-transitory computer readable medium containing computer instructions that, if executed, cause a computer processor to:
   download a copy of a multi-agency real estate listing database, which contains stored real estate listings associated with a plurality of different real estate companies, to a real estate server for a first real estate company communicatively coupled to the multi-listing database, the processor being associated with the real estate server;
   modify the copy of the real estate listing database for operation with a mobile platform by reformatting the copy of the real estate listing database to accommodate display on the mobile platform;
   communicate with a consumer wireless communication device operable by a user and containing a downloaded software application program that permits the wireless communication device to communicate with the real estate server, the software application program being configured to display a map on a touch-sensitive display of the wireless communication device, the display of the map being alterable by the user by drawing directly on the touch-sensitive display of the wireless communication device to demarcate a search area on the displayed map as a user-selected search parameter;
   receive, at the real estate server, a real estate search request from the wireless communication device, the real estate search request including user-selected search parameters, including the demarcated search area on the displayed map;
   apply the user-selected search parameters, including the demarcated search area on the displayed map, to search the modified database to thereby generate search results; and
   communicate with the wireless communication device to transmit the search results to the wireless communication device for display on the wireless communication device.

14. The computer readable medium of claim 13 wherein the display of the wireless communication device is a touch sensitive display and the software application program contains computer instructions that, if executed, cause a processor within the wireless communication device to:
   display a list of available real estate properties, corresponding to the search results, on the display of the wireless communication device; and
   detect a first single user motion on the touch sensitive display to save information related to a particular real estate property listed on the display and a second single user motion on the touch sensitive display to delete information related to the particular real estate property listed on the display.

15. The computer readable medium of claim 14 wherein detecting the first single user motion on the touch sensitive display comprises detecting a finger swipe motion across the touch sensitive display in a first predetermined direction and detecting the second single user motion on the touch sensitive display comprises detecting a finger swipe motion across the touch sensitive display in a second predetermined direction different from the first predetermined direction.

16. The computer readable medium of claim 13 wherein the user-selected search parameters include at least one of a group of parameters consisting of: a number of bedrooms, a number of bathrooms, a square footage, a date of construction, a price, a zip code, and a city.

* * * * *